C. BOWMAN.
HAY RACK.
APPLICATION FILED SEPT. 24, 1915.
1,185,052.
Patented May 30, 1916.
2 SHEETS—SHEET 1.
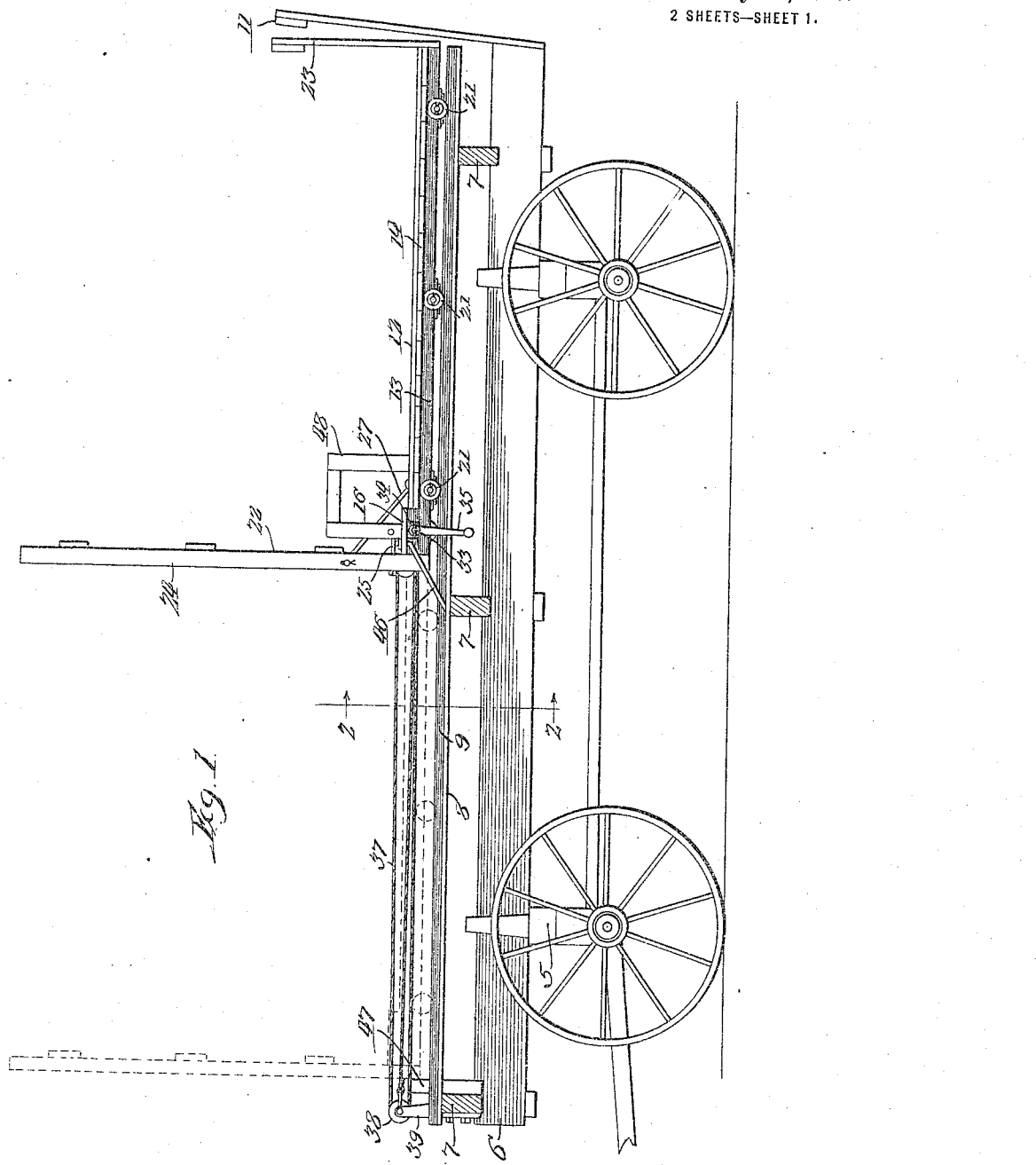

C. BOWMAN.
HAY RACK.
APPLICATION FILED SEPT. 24, 1915.
1,185,052.
Patented May 30, 1916.
2 SHEETS—SHEET 2.
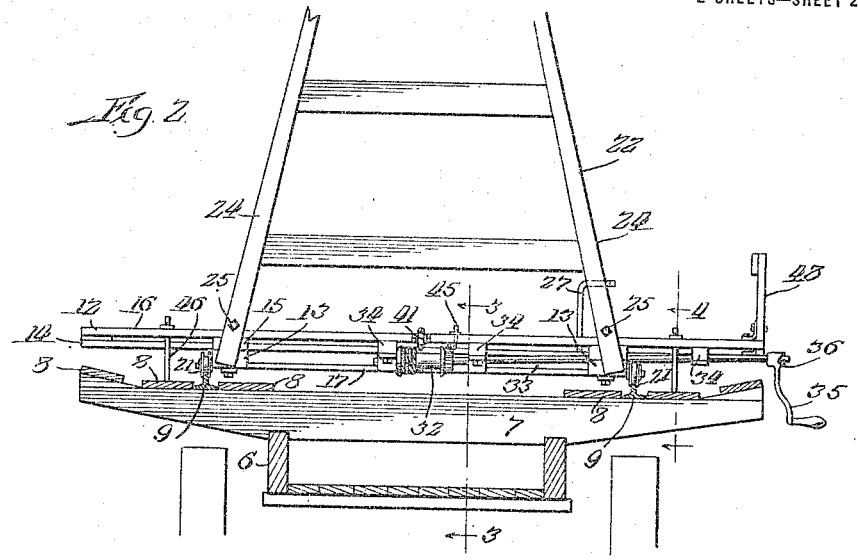
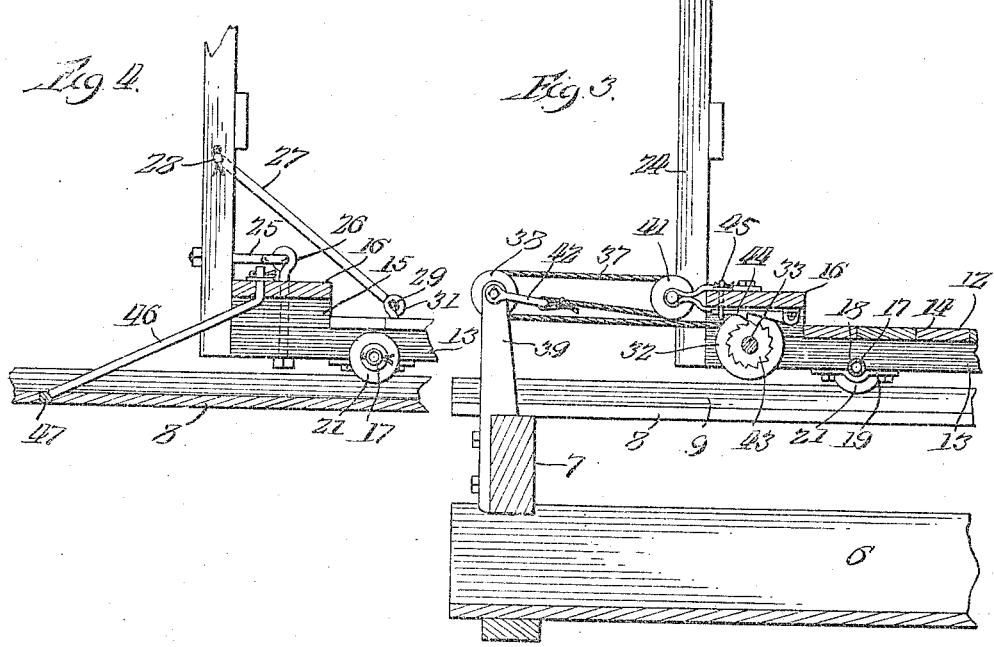
Inventor:
Charles Bowman
by Ford & Wilson
Attys:

UNITED STATES PATENT OFFICE.

CHARLES BOWMAN, OF POPLAR GROVE, ILLINOIS.

HAY-RACK.

1,185,052.

Specification of Letters Patent.

Patented May 30, 1916.

Application filed September 24, 1915. Serial No. 52,372.

*To all whom it may concern:*

Be it known that I, CHARLES BOWMAN, a citizen of the United States, residing at Poplar Grove, in the county of Boone and State of Illinois, have invented certain new and useful Improvements in Hay-Racks, of which the following is a specification.

This invention relates in general to hay racks and has more particular reference to that class of hay racks in which a supplemental carriage or hay truck is mounted to travel lengthwise on the top of a hay rack for the purpose of facilitating loading the same by means of a hay loader. In devices of this character, the hay truck is initially positioned at the rear end of the rack and, after having been filled with hay by the loader, it is moved to the forward end of the rack, this obviating the necessity of pitching the hay forwardly and arranging it on the rack by hand.

The primary object of my invention is to provide a simple and improved hay rack of the character described, and to so construct the same that it may be easily operated, will be strong and durable and amply capable for the services required of such device, and may be manufactured at a low cost.

Other and more specific objects of my invention consist in the provision of a hay truck that will set low on a hay rack, a simple mechanism for moving the truck lengthwise on a rack, including a crank-operated drum mounted directly on the truck and being connected to the rack by a cable in an advantageous manner, novel means for holding the truck in its rearmost position, and an improved standard structure for the truck.

My invention, its mode and principle of operation will be better understood by reference to the following description and when considered in connection with the accompanying drawings, wherein;

Figure 1 is a side elevation of a hay rack embodying my improvements, the rack proper being shown in longitudinal section; Fig. 2 is a cross sectional view through the hay rack taken on the line 2—2 of Fig. 1; Fig. 3 is an enlarged vertical sectional view taken on the line 3—3 of Fig. 2, and showing the hay truck moved to a forward position on the rack; and Fig. 4 is a vertical sectional view taken on the line 4—4 of Fig. 2.

Referring to the drawings, it will be observed that I have shown for purposes of illustration, a conventional type of running gear and hay rack designated by reference characters 5 and 6, respectively. The latter includes cross-bars 7 upon the tops of which are secured longitudinally extending rails 8 forming part of the rack bed. Interposed between certain of these rails and secured fixedly on the tops of the cross-bars 7 are a pair of T-iron tracks 9 extending longitudinally of the rack and positioned directly above the wheels. A low standard 11 is attached to the rear end of the rack. A hay truck or carriage which is mounted to travel lengthwise on the tracks 9 will now be described.

The hay truck, designated in general by reference character 12 is so constructed that it lies comparatively low on the rack and displaces as small a space as possible. The truck comprises two longitudinal beams 13 extending the entire length of the truck, a board platform 14 secured directly to the top of the beams 13, blocks 15 secured to the top of the front ends of the said beams, a cross-board 16 surmounting and attached to the blocks 15, and pipe sections 17 extending crosswise of the platform and secured in recesses 18 therein by cleats or brackets 19 bolted to the beams 13 and being equipped with flanged rollers or wheels 21, which ride on the tracks 9 at the outer sides of said beams. The truck is equipped with standards 22 and 23 at its front and rear ends respectively, the front standard or ladder being so pivotally mounted on the truck that a portion projects below the top of the adjacent truck structure whereby said projecting portion will abut against the front end of the truck and hold the standard against swinging forwardly. The front standard is constructed of uprights 24 joined by cross-bars and is pivotally mounted on the truck by means of eye bolts 25, passing through the uprights a substantial distance above their lower ends, the heads of said bolts being pivotally connected with eye bolts 26 which are passed through the top cross-board 16, blocks 15, and the beams 13 as shown in Fig. 4. It will be apparent by this construction that the lower ends of the uprights in abutting against the forward end of the truck prevent the standard from swinging forwardly on its pivots. The standard is held in upright position by means of a brace 27 pivoted to one end 28 of one of the uprights above its pivotal point and provided at its opposite end with a hook 29 adapted to engage an eye bolt 31 secured to the truck. By disengaging the hook, it will be apparent that the standard or ladder may be swung backwardly onto the truck.

Manually operated means are provided for drawing the hay truck from its rear to forward position, this means being operated by a crank from one side of the hay rack and, in general, comprises a drum mounted on the truck and a cable connection between the drum and rack run over a system or combination of pulleys, the drum being operated by the crank. More particularly, the drum 32 is mounted fixedly on a cross-shaft 33 which is journaled in bearing brackets 34 secured to the underside of the cross-board 16. Referring to Fig. 2, it will be noted that the cross-shaft extending from the central portion of the truck to the extremity of one side thereof, is inclined with respect to said cross-board so as to permit a sufficiently large drum to be used and yet retain a low truck structure. A drum, secured to the inner end of the cross-shaft and disposed centrally of the truck, is turned by means of a hand crank 35 mounted to slide axially on the shaft from an inner inoperative position beneath the truck to an outer position shown in Fig. 2, wherein the crank will engage pins 36 projecting from the shaft. The system of pulleys and cable therefor, consists of a cable 37 attached at one end to the drum 32, extending forwardly therefrom and run over a pulley 38 carried by a bracket 39 secured to and projecting upwardly from the front cross-bar 7 of the hay rack, thence rearwardly and over a pulley 41 mounted on the cross-board above the drum, and being connected at its opposite end to a U-shaped bolt 42 pivoted to the bracket 39. A ratchet wheel 43 integral with one end of the drum is adapted to be engaged by a pawl 44 pivoted to the cross-board 16, a swivel hook 45 being employed to engage beneath the outer end of the pawl to hold the same in inoperative position, as shown in Fig. 3. From the foregoing, it will be apparent that by turning the crank 35 in a clockwise direction, viewing Fig. 1, the truck will be drawn forwardly from its rear position, a mechanical advantage being gained by the system of pulleys, which permits the truck to be moved easily when heavily loaded with hay.

In order to preclude movement of the truck forwardly from its rear position, a pair of pendant braces or stops 46 swiveled on the cross-board 16 are provided and arranged so that their lower ends will engage in sockets 47, Fig. 4, in rails 8 when in locking position. When it is desired to move the truck forwardly, these braces are swung by hand laterally beneath the truck. In the operation of loading the hay rack, the truck is positioned at the rear of the rack as shown in Fig. 1, so that a hay loader hitched to the rear end of the hay rack will elevate hay and deposit it on the truck. To maintain the truck securely locked in this position the braces 46 are engaged in their sockets, the pawl 44 released by turning the swivel hook 45, and the crank turned to wind the cable taut, thus exerting a constant upward pressure on the braces 46 to hold them in locking position and also preventing movement of the truck rearwardly, the pawl precluding unwinding of the drum. When the truck has been loaded with hay, the braces 46 are released and the crank turned by an operator so as to draw the truck forwardly on the tracks until its front end abuts against the stop 47. The crank is then slid axially of the cross-shaft to a position beneath the truck so as not to project beyond the side thereof. A guard 48 on the truck prevents hay from overhanging the space required in which to turn the crank.

Hay racks of the character described have recognized advantages, these consisting mainly in dispensing with hand labor required for pitching hay forwardly and arranging it on the rack and making possible such loading of the hay as will permit the same to be very easily and quickly removed from the rack by means of a power-operated fork.

My improved structure provides a low truck of exceedingly simple construction and a novel operating means for drawing the truck forwardly. This means, it will be noted, may be easily operated and comprises but few parts. Moreover, the forward end of the truck is constructed so as to house these operating parts and also permit the truck to be built low.

I claim:

1. The combination with a hay rack, of a hay truck mounted to travel lengthwise thereon and having a hay-receiving platform of a width substantially equal to that of the rack, a cross shaft journaled on the platform extending to one side thereof, a drum secured to the cross shaft, a cable connection from the drum to the rack whereby when the cross shaft is turned the cable will be wound on the drum and draw the truck forwardly on the rack, and a crank loosely mounted on the outer end of the cross shaft and coöperable therewith so as to be slidable axially thereon from an operative position wherein it is disposed at the outer end of the cross shaft and adapted to be turned by an operator at the side of the rack to move the truck forwardly thereon, to an inoperative position within the outer edge of and beneath the truck and out of driving connection with the cross shaft.

2. The combination with a hay rack equipped with longitudinally extending tracks or ways, of a hay truck comprising a hay-receiving platform mounted to slide longitudinally on said tracks or ways and arranged in close proximity thereto so as to provide a comparatively low hay truck, the front end of the platform being raised above the plane thereof to support and accommodate a truck-moving device therebeneath, which latter consists of a cross shaft journaled on the underside of said raised platform portion and equipped with a drum, manually operable means at one side of the rack for rotating the drum and a cable connection between the drum and rack whereby the truck may be moved forwardly on the rack by rotating the drum.

CHARLES BOWMAN.

Copies of this patent may be obtained for five cents each, by addressing the "Commissioner of Patents, Washington, D. C."